United States Patent [19]

Whitmire

[11] 4,445,370
[45] May 1, 1984

[54] OIL TO GASOLINE PROPORTIONING DEVICE FOR TWO CYCLE ENGINES

[76] Inventor: William E. Whitmire, Buckhead Ridge, Rte. 4, 118 20th St., Okeechobee, Fla. 33472

[21] Appl. No.: 346,905

[22] Filed: Feb. 8, 1982

[51] Int. Cl.$^3$ ............................................. G01F 23/04
[52] U.S. Cl. .......................... 73/290 B; 33/126.7 A; 73/428; 116/227
[58] Field of Search ............... 73/290 B, 428, 426, 73/427; 116/227; 33/126.7 R, 126.7 A, 150

[56] References Cited

U.S. PATENT DOCUMENTS

| | | | |
|---|---|---|---|
| 1,248,818 | 12/1917 | Crouse | 73/428 X |
| 1,476,321 | 12/1923 | Ashworth et al. | 116/227 X |
| 2,027,494 | 1/1936 | Trabold | 73/428 X |
| 2,607,122 | 8/1952 | Overmyer et al. | 33/126.7 A |
| 2,648,133 | 8/1953 | Kosnoskie et al. | 33/126.7 R |
| 3,006,314 | 10/1961 | Maler | 116/227 |
| 3,948,105 | 4/1976 | Johnson, Jr. | 73/427 |
| 4,141,310 | 2/1979 | Rich, Jr. | 116/227 X |

*Primary Examiner*—Gerald Goldberg
*Assistant Examiner*—Tom Noland
*Attorney, Agent, or Firm*—Alfred E. Wilson

[57] ABSTRACT

This invention relates to a proportional measuring device for determining the amount of oil that should be added to any quantity of gasoline that is added to the fuel tank of a two cycle engine to maintain the proper proportions of oil to gasoline for efficient operation of the engine. In the operation of internal combustion engines of the two-cycle type it is customary to add oil to the gasoline in the approximate proportions of one pint of oil per six gallons of gasoline to insure proper lubrication of the movable engine parts. Difficulties have heretofore been encountered in determining the amount of oil to add when a quantity of gasoline is added to a partially filled tank having the correct proportions of oil to gasoline. With my "Exact-Oil" measuring device it is possible to add any desired quantity of gasoline to a partially filled tank and then to determine accurately the amount of oil that should be added to that quantity of gasoline to maintain the proper proportions of oil to gasoline in the tank.

3 Claims, 1 Drawing Figure

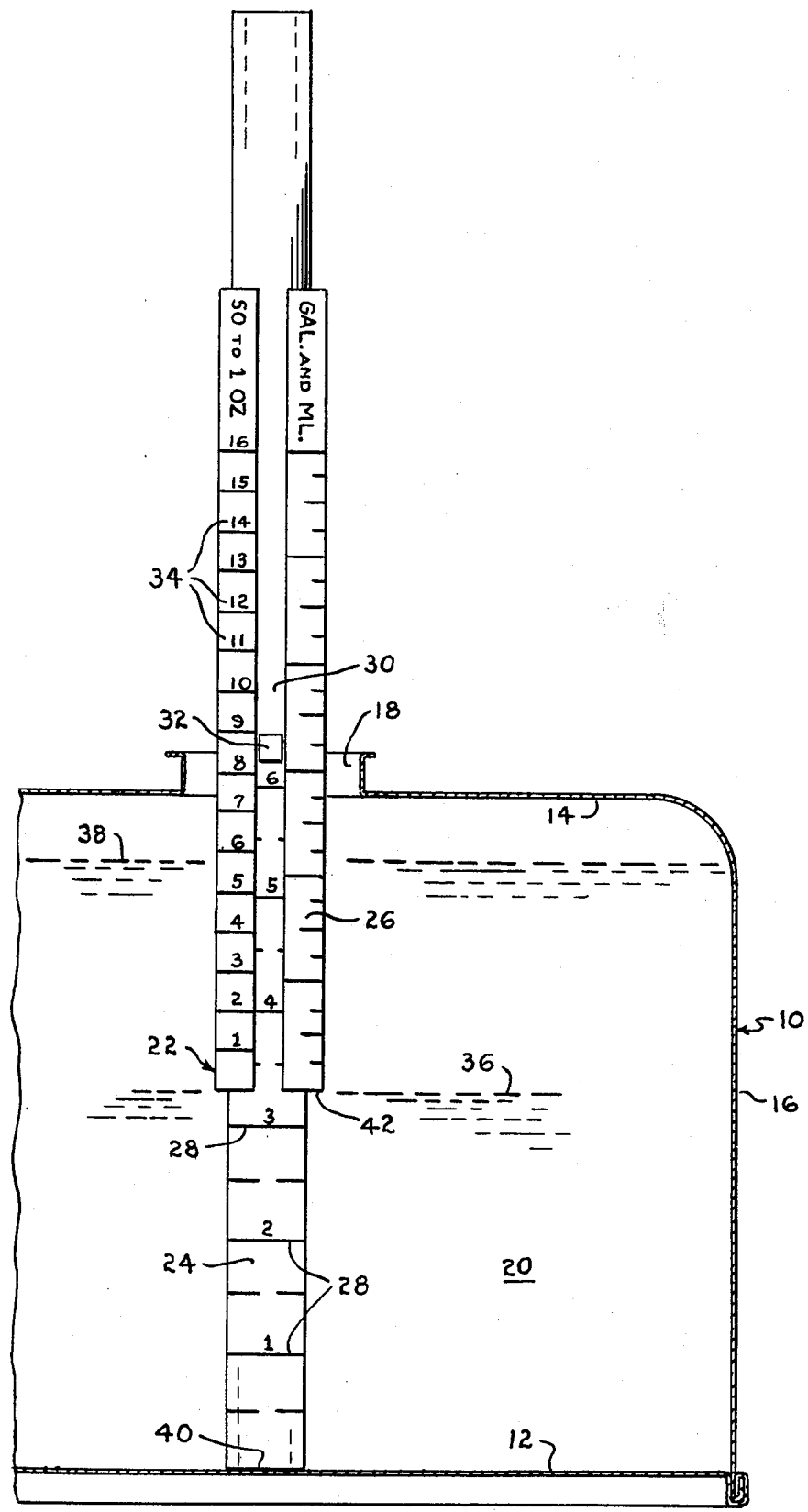

OIL TO GASOLINE PROPORTIONING DEVICE FOR TWO CYCLE ENGINES

BACKGROUND OF THE PRESENT INVENTION

In the operation of two-cycle internal combustion engines it is important that an acceptable proportion of oil to gasoline be maintained. If too high a percentage of oil to gasoline is present the spark plugs are subject to fouling up and the pistons and valves are subject to undesirable carbon deposits whereupon the engine will not operate effeciently, and difficulties are encountered in starting the engine. If the percentage of oil to gasoline is too low there is a danger of the engine freezing up whereupon the pistons will not move within the cylinders.

Many attempts have heretofore been made to devise a readily workable system whereby the necessary quantity of oil can be added to gasoline to maintain the desired proportions oil to gasoline where additional fuel is added to a partially filled tank.

THE PRIOR ART PATENTS

The following patents are representative of several previously issued patents directed to the need to add oil to gasoline in the operation of two-cycle engines. These and all of the other patents that have been located in a patent novelty search are directed to the idea of determining the proper proportions of oil to be added to gasoline when a partially filled tank is filled.

An example of these prior art patents is the patent to Irwin U.S. Pat. No. 3,058,353 of 1962. He provides a measuring cup 5 for the oil, and a slidable rod 12 to project into the tank 2 to determine the level and hence the quantity of gasoline already in the tank. The point on the rod that was wet by the gasoline in the tank is then aligned with the bottom of the measuring cup 5 and the point 7d on the rod 12 indicates the amount of oil that should be put in the measuring cup to provide the proper proportions of oil to gasoline added to fill the tank 2. If it is desired to add a quantity of gasoline less than the amount necessary to fill the tank 2 then there is no way to determine the correct amount of oil to add. That is the problem which this invention solves.

This same idea of determining the amount of oil to be added to the gasoline to completely fill the tank and provide the proper proportion or mixture is embodied in the patents to Mowat U.S. Pat. Nos. 2,712,396 and 2,788,801; Petree U.S. Pat. No. 1,580,529; Butler U.S. Pat. No. 4,135,404 and others, none of which indicate the proper amount of oil to be added when the tank is not to be completely filled. The patent to Flynn U.S. Pat. No. 1,378,536 shows telescoping members that are employed to determine the quantity of a liquid in a tank car. The operation is completely different from Applicant's invention because it is only used to determine the quantity of liquid in the tank car, and the gauge is never inserted into the liquid in the tank car.

THE OBJECTS OF THIS INVENTION

The object of my invention is to determine the quantity of oil that should be added to any quantity of gasoline that is added where the tank is not to be completely filled.

A further object resides in the provision of a gauge having telescoping members by which it is possible to determine the correct proportion of oil that should be added to any quantity of gasoline that is added to a fuel tank wherein the tank is not completely filled.

Another object of my invention is to provide a two part telescoping gauge wherein one telescoping member is employed to measure the quantity of one liquid, and the other telescoping member indicates the quantity of another liquid that should be added to maintain a desired ratio of the two liquids.

THE DRAWING

The drawing is a side elevational view of the gauge positioned in a tank shown in section.

DESCRIPTION OF A PREFERRED EMBODIMENT

Referring now to the drawing a fuel tank of the standard approximately 6 gallon capacity 10 is illustrated. The fuel tank 10 is rectangular in shape having bottom and top closure members 12 and 14 and end closures 16, only one of which is shown in the drawing. A filling opening 18 is positioned in the top closure 14 near one of the end closures 16. A suitable cap or closure member is provided to close the filling opening 18, and of course the cap is provided with a suitable vent to permit air to enter the space 20 within the tank as the fuel is withdrawn therefrom to operate the engine.

It is of course important to add the correct proportion of oil to whatever quantity of gasoline is added to the tank. This has been extremely difficult where the quantity of gasoline being added is less than the amount required to fill the tank 10. The desired proportion of oil to gasoline is approximately one part of oil to six gallons of gasoline. Heretofore when the amount of gasoline being added to a partially filled fuel tank is less than the quantity required to fill the tank difficulties have been experienced in determining the amount of oil to be added, and as a result too much or too little oil is frequently used with the attendant disadvantages herein discussed.

I have devised a telescoping gauge 22 by which the precise amount of oil to be added to any quantity of gasoline can readily be determined. My telescoping gauge 22 is preferably formed of cooperating inner and outer pipes 24 and 26 suitably sized to maintain readily operable telescoping movement relative to each other but tight enough to hold a setting when the outer member or pipe 26 is moved to a desired position relative to the inner pipe 24.

The inner pipe 24 is sufficiently long that the gauge can be projected through the filling opening 18 and touch the bottom 12 of the tank in a vertical position. The inner pipe 24 is marked with graduations such as 1, 2, 3, 4 etc. to indicate the approximate amount of gasoline that is in the tank when it is desired to add gasoline to the mixture of gasoline and oil already in the tank 10. The tank 10 being a 6 gallon tank the graduations 28 on the inner pipe 24 run 1 to 6 with suitable graduations to indicate fractional gallonage. It will of course be apparent that graduations can also be placed on the inner pipe 24 to designate liters or any other desired unit of measurement.

The outer pipe 26 has a longitudinal slot 30 aligned with the graduations 28, and held against rotation on the inner pipe 24 by a guide 32 adapted to slide within the slot 30 and to maintain the graduations 28 visible through the slot 30. The outer pipe 26 has graduations 34 for example to indicate ounces of oil or any other unit of measurement to indicate the proportion of oil to be added.

The operation is as follows. Assume that a mixture of gasoline and oil having a predetermined ratio of oil to gasoline is in the tank 10, up to the level 36, and that it is desired to addaan additional quantity of gasoline up to the level 38, but less than the amount required to fill the tank 10, and to add the desired proportion of oil to the tank 10 to maintain the desired predetermined ratio of oil to gasoline in the tank.

The outer pipe 26 is shifted upwardly on the inner pipe 24, and the gauge is introduced through the filling opening 18 to touch the bottom end 40 of the inner pipe 24 on the bottom wall 12 of the tank 10. The gauge is then removed from tank 10 and the outer pipe is moved downwardly on the inner pipe to align the bottom end 42 of the outer pipe with the "wet mark" of the liquid on the inner pipe 24 corresponding with the level 36 of the mixture of gasoline and oil previously in the tank 10. Any desired amount of gasoline is then added to the tank 10, for example to raise the level in the tank to the level 38. The gauge is then reintroduced into the tank and the "wet mark" of the liquid on the outer pipe 26 is observed, and the graduations 34 on the outer pipe 26 at the wet point indicates the amount of oil in ounces to be added to the quantity of gasoline added as shown by the difference between the levels 36 and 38 to maintain the desired ratio of oil to gasoline in the tank 10.

My improved gauge may be used to measure other liquids than gasoline and oil. For example to measure paint ingredients where it is desired to produce a new color by adding one color of paint to another color to produce a third or different color. By the use of my improved gauge it is of course possible to precisely reproduce desired colors by adding together desired proportions of two other colors.

This telescoping gauge can be formed to advantage for example by the use of P.V.C. Schedule 40 pipe. The inner pipe 24 can be ½" outside diameter, or a little larger, and the outside pipe 26 can be ½" inside diameter pipe or a little smaller. The outside pipe can for example have the ⅜" slot 30 cut therein, and then the outside pipe can be spread a little to profide a degree of tension on the inside pipe to hold it in any position to which it is moved on the inside pipe.

It will of course be apparent that this improved gauge can be calibrated for use with different sizes and shapes of fuel tanks. Also it will be apparent that it can be used to advantage for all two cycle engines such for example as those used to propel boats, snowmobiles, chain saws and any other engines wherein the oil is added to the gasoline or other liquid used as a fuel.

I claim:

1. The method of determining the quantity of a second liquid to be added to a quantity of a first liquid to maintain a predetermined mixture ratio of the two liquids in a tank wherein a quantity of the first and second liquids having the desired mixture ratio is in the tank which comprises the steps of utilizing the first of a pair of relatively movable scale members to indicate the quantity of the first and second liquid mixture in the tank, aligning the end of the second of the pair of relatively movable scale members with the point on the first scale indicating the quantity of the mixture in the tank, adding a quantity of the first liquid in the tank and utilizing the second of the scale members to measure the quantity of the first liquid added to the contents of the tank and to indicating the quantity of the second liquid to be added to maintain the desired ratio.

2. The method as defined in claim 1 wherein the first and second liquids are gasoline and oil, and the pair of relatively movable members is a pair of telescoping inner and outer pipe members wherein the inner pipe has graduations to measure the quantity of the mixture in the tank, and the outer pipe has graduations to measure the quantity of gasoline added and to indicate the quantity of oil to be added to maintain the desired ratio of oil to gasoline.

3. The method defined in claim 2 wherein the outer telescoping pipe is slotted lengthwise to render the graduations on the inner pipe visable as the outer pipe is moved relative to the inner pipe.

* * * * *